US010190277B2

(12) United States Patent
Al Azab Al Naqbi et al.

(10) Patent No.: US 10,190,277 B2
(45) Date of Patent: Jan. 29, 2019

(54) METHOD FOR TREATING OIL

(71) Applicant: United Arab Emirates University, Al Ain (AE)

(72) Inventors: Mohamed Al Azab Al Naqbi, Al Ain (AE); Yaser E. Greish, Al Ain (AE); Afra Al Blooshi, Al Ain (AE)

(73) Assignee: United Arab Emirates University, Al Ain (AE)

( * ) Notice: Subject to any disclaimer, the term of this patent is extended or adjusted under 35 U.S.C. 154(b) by 37 days.

(21) Appl. No.: 15/065,547

(22) Filed: Mar. 9, 2016

(65) Prior Publication Data
US 2016/0264767 A1 Sep. 15, 2016

Related U.S. Application Data
(60) Provisional application No. 62/130,199, filed on Mar. 9, 2015.

(51) Int. Cl.
| | |
|---|---|
| *E02B 15/04* | (2006.01) |
| *B01D 15/00* | (2006.01) |
| *D01D 5/00* | (2006.01) |
| *D01F 6/22* | (2006.01) |
| *B09C 1/00* | (2006.01) |

(52) U.S. Cl.
CPC ............. *E02B 15/04* (2013.01); *B01D 15/00* (2013.01); *B09C 1/00* (2013.01); *D01D 5/003* (2013.01); *D01F 6/22* (2013.01); *B09C 2101/00* (2013.01)

(58) Field of Classification Search
CPC ....... E02B 15/04; B09C 1/00; B09C 2101/00; D01D 5/003; D01F 6/22; B01D 15/00
See application file for complete search history.

(56) References Cited

U.S. PATENT DOCUMENTS 3,494,862 A * 2/1970 Horowitz ................. B01J 20/22
210/502.1
3,756,948 A 9/1973 Weinberg
(Continued)

FOREIGN PATENT DOCUMENTS

| CN | 101864275 A * | 10/2010 |
| EP | 0518336 A1 | 12/1992 |

(Continued)

OTHER PUBLICATIONS

Eda, Goki, "Effects of Solution Rheology on Electrospinning of Polystyrene." Thesis submitted to Worcester Polytechnic Institute, Apr. 2006, 90 pages.
Huan, Siqi, et al., "Effect of Experimental Parameters on Morphological, Mechanical and Hydrophobic Properties of Electrospun Polystyrene Fibers," Materials, 2015, vol. 8, pp. 2718-2734.
(Continued)

*Primary Examiner* — Taiwo Oladapo
(74) *Attorney, Agent, or Firm* — Fitch, Even, Tabin & Flannery LLP

(57) ABSTRACT

A method for treating an oil spill includes providing a polystyrene-based sorbent in the form of polystyrene microfibers having a sorption capacity in the range of between 30 g/g to 217 g/g, measured as grams of oil sorbed per one gram of the sorbent; drenching the polystyrene microfibers in the oil spill to be treated; collecting the oil drenched polystyrene microfibers; and removing excess oil from the oil drenched polystyrene microfibers by compressing the microfibers. The method further includes dissolving the oil drenched polystyrene microfibers in a petroleum-based solvent in the form of gasoline having an octane number of ninety one, in which both the oil drenched polystyrene microfibers and the oil is soluble, thereby forming a solution comprising the gasoline having dissolved therein the polystyrene microfibers and the oil; and utilizing the solution as a feedstock for feeding a refinery.

12 Claims, 11 Drawing Sheets

(56) References Cited

U.S. PATENT DOCUMENTS 4,052,306 A * 10/1977 Schwartz ................ E02B 15/06
210/242.3
5,360,654 A 11/1994 Anderson et al.

FOREIGN PATENT DOCUMENTS

WO  2012/007927 A1  1/2012
WO  WO 2012007927 A1 * 1/2012 ................ C09K 3/32

OTHER PUBLICATIONS

Lin, Jinyou, et al., "Nanoporous Polystyrene Fibers for Oil Spill Cleanup," Marine Pollution Bulletin, vol. 64, 2012, pp. 347-352.
Kang, Minsung, et al., "Preparation of Superhydrophobic Polystyrene Membranes by Electrospinning," Colloids and Surfaces A: Physicochemical and Engineering Aspects, 313-314, 2008, pp. 411-414.
Pattamaprom, Cattaleeya, et al., "The Influence of Solvent Properties and Functionality on the Electrospinnability of Polystyrene Nanofibers," Macromolecular Materials and Engineering, vol. 291, 2006, pp. 840-847.
Uyar, Tamer, et al., "Electrospinning of Uniform Polystyrene Fibers: The Effect of Solvent Conductivity," Polymer, vol. 49, 2008, pp. 5336-5343.
Zhu, Haitao, et al., "Evaluation of Electrospun Polyvinyl Chloride/Polystyrene Fibers as Sorbent Materials for Oil Spill Cleanup," Environmental Science & Technology, vol. 45, 2011, pp. 4527-4531.

* cited by examiner

Table 1. Crude oil and crude oil- derivatives sorption capacities of various synthetic polymer-based sorbents as compared to the nonwoven polystyrene microfibers investigated in the current work

| Type of Sorbent | Sorption capacity (%) | Reference |
|---|---|---|
| Nonwoven polypropylene | 14.0-15.0 | Wei et al, 2003 |
| Recycled nonwoven material (RWNM) (78% wool/22% polyester) | 11.0 | Radetić et al, 2008 |
| Wool-based nonwoven material (78% wool/22% polyester) | 11.5 | Radetić et al, 2003 |
| Macroporous rubber gels | 38.0 | Karakutuk and Okay, 2010 |
| Crosslinked poly(octadecene-alt-maleic anhydride) copolymers | 45.0-55.0 | Atta et al, 2007 |
| Polyurethane foams modified by polystyrene grafting | 58.0 | Tanobe et al, 2008 |
| Thermodegradable polyolefin oil superabsorbent polymer | 45.0 | Yao et al, 2012 |
| Butyl rubber | 23.0 | Ceylan et al, 2009 |
| Network polymer 4-tert-butylstyrene–SBR–divinylbenzene | 58.0 | Zhou et al, 2001 |
| Porous polyurethane foams based on recycled poly(ethylene terephthalate) | 40.0 | Atta et al, 2013 |
| Exfoliated graphite | 38.2 | Tryba et al, 2000 |
| Nonwoven polystyrene microfibers | 217.0 | This work |

Figure 10

METHOD FOR TREATING OIL

CROSS-REFERENCE TO RELATED APPLICATION

This application claims priority from U.S. Provisional Patent Application No. 62/130,199, filed Mar. 9, 2015, which is incorporated herein by reference in its entirety.

FIELD OF INVENTION

This invention relates to a method for treating oil. More specifically, the invention relates to treatment of oil spills, such as, for example crude oil spills, thereby to clean up the oil spill and/or retrieve oil from the oil spill.

BACKGROUND

In this specification, the term "oil" shall be interpreted sufficiently broadly to include any type of an oil and further to include organic or other petroleum based products, such as, for example crude oil or refined petroleum products. In this specification, the term "microfiber" shall be interpreted to include either microfibers alone or nanofibers alone or combinations of microfibers and nanofibers.

Oil from oil spills is responsible for causing widespread damage to an environment, such as terrestrial or aquatic environments. As such, oil spills are of a global concern due to their environmental and economic impact.

Nonwoven polypropylene fibrous mats have been widely used in oil spill cleanup by applying the mats to the oil spill. Nonwoven polypropylene fibrous mats are not ideal, however, as their sorption capacity is relatively low and the use thereof results in the production of further pollution, namely the oil drenched fibrous mats used to collect the oil spill.

Another method for cleaning up oil spills is proposed in Chinese Patent No. CN101864275, which discloses a polystyrene microfiber oil absorbent material for offshore or water-surface oil spill treatment. The oil absorbent material is in the form of a film, blanket, absorption felt or oil absorbing cotton, which is applied to the oil spill for absorbing the oil.

A disadvantage of the method discloses in Chinese Patent No. CN101864275 is that after cleaning up the oil spill, the oil drenched absorbent material constitutes a pollutant which contributes to the pollution of the environment.

U.S. Pat. No. 3,756,948 describes another method for cleaning up oil spills. More specifically, U.S. Pat. No. 3,756,948 discloses a method for absorbing crude oil from a body of water or from a polluted beach, using crumbs of foamed polystyrene which are applied to the oil. The method includes dissolving oil saturated crumbs of foamed polystyrene such that the polystyrene dissolves and the oil is released so as to form two layers of different specific gravity, namely, a layer of solvent including dissolved polystyrene and a layer of crude oil. These layers are then separated by decantation or distillation.

One disadvantage of the method discloses in U.S. Pat. No. 3,756,948 is that the resultant solution containing dissolved polystyrene is itself a pollutant which further contributes to pollution of the environment.

A need therefore exists for a method of treating oil, particularly, treating an oil spill which method at least ameliorates the generation of further pollutants. A need further exists for a more environmentally advantageous method of processing these further pollutants in a manner which is less damaging to the environment.

SUMMARY OF INVENTION

According to the invention there is provided a method for treating oil, the method comprising:
providing a polystyrene-based sorbent;
drenching the polystyrene-based sorbent in the oil to be treated;
dissolving the oil drenched polystyrene-based sorbent in a petroleum-based solvent in which both the oil drenched polystyrene-based sorbent and the oil is soluble, thereby forming a solution comprising the petroleum-based solvent having dissolved therein the polystyrene-based sorbent and the oil; and
utelising the solution as a feedstock for feeding a refinery.

The applicant has advantageously found that the solution is particularly suitable for use as the feedstock for feeding the refinery. More particularly, the polystyrene-based sorbent may advantageously have a sufficiently high sorption capacity so as to results in a sufficiently low ratio in the solution of polystyrene microfibers to sorbed crude oil, to render the solution suitable as a feedstock for feeding the refinery. More specifically, the polystyrene-based sorbent may advantageously have a sorption capacity in the range of between 30 g/g to 217 g/g, measured as grams of oil sorbed per one gram of the polystyrene-based sorbent.

The method may, after the step of drenching the polystyrene-based sorbent in the oil to be treated, further include the step of collecting the oil drenched polystyrene-based sorbent.

The method may, after the step of drenching the polystyrene-based sorbent in the oil to be treated, further include removing excess oil from the oil drenched polystyrene-based sorbent, prior to dissolving the oil drenched polystyrene-based sorbent in the petroleum-based solvent. The removing of excess oil from the oil drenched polystyrene-based sorbent may include compressing the oil drenched polystyrene-based sorbent, thereby to remove excess oil from the oil drenched polystyrene-based sorbent.

The step of utilising the solution as a feedstock for feeding a refinery may, more particularly, include feeding the solution into the refinery. The step of feeding the solution into the refinery may, more specifically, include feeding the solution into the refinery, which particularly is in the form of a conventional petroleum refinery.

The polystyrene-based sorbent may be in the form of polystyrene microfibers. More particularly, the polystyrene microfibers may be formed by a process of electrospinning. The polystyrene microfibers may have an average size of approximately between 1 μm and 12 μm.

The polystyrene microfibers may have a Brunauer-Emmett-Teller (BET) surface area of approximately between approximately 32 m$^2$/g and 53 m$^2$/g. The polystyrene microfibers may have hydrophobic characteristics. The polystyrene microfibers may have oleophilic characteristics.

In a particular embodiment, the polystyrene microfibers may be formed from recycled material, wherein the recycled material is obtained from preformed polystyrene-containing waste, such as, for example discarded packaging.

In a particular embodiment, the polystyrene microfibers may comprise randomly orientated microfibers. More particularly, the polystyrene microfibers may form a cotton-like assembly.

The petroleum-based solvent may be selected from the group comprising gasoline, kerosene and gas oil. More specifically, the solvent may be gasoline having an octane number in the range of between 78 and 95. Most preferably, the gasoline may have an octane number of 91.

Due to the chemical nature of the petroleum-based solvent and the polystyrene-based sorbent, the solution comprises hydrocarbons and as such, may have a suitable chemical composition to serve as the feedstock for the refinery. More specifically, the solution may be particularly suitable to serve as the feedstock due to its overall structural similarity with crude oil. The solution may comprise a homogeneous mixture of the petroleum-based solvent, the dissolved polystyrene-based sorbent and the dissolved oil. The solution may be in the form a clear solution. More specifically, the solution may comprise materials in the liquid phase.

BRIEF DESCRIPTION OF DRAWINGS

Further features of the invention are described hereinafter by way of a non-limiting example of the invention, with reference to and as illustrated in the accompanying diagrammatic drawings. In the drawings:

FIG. 10 shows a table tabulating crude oil and crude oil-derivatives sorption capacity of various synthetic polymer based sorbents as compared to the polystyrene-based sorbents of FIGS. 1A to 1F.

DETAILED DESCRIPTION

Figure 11:
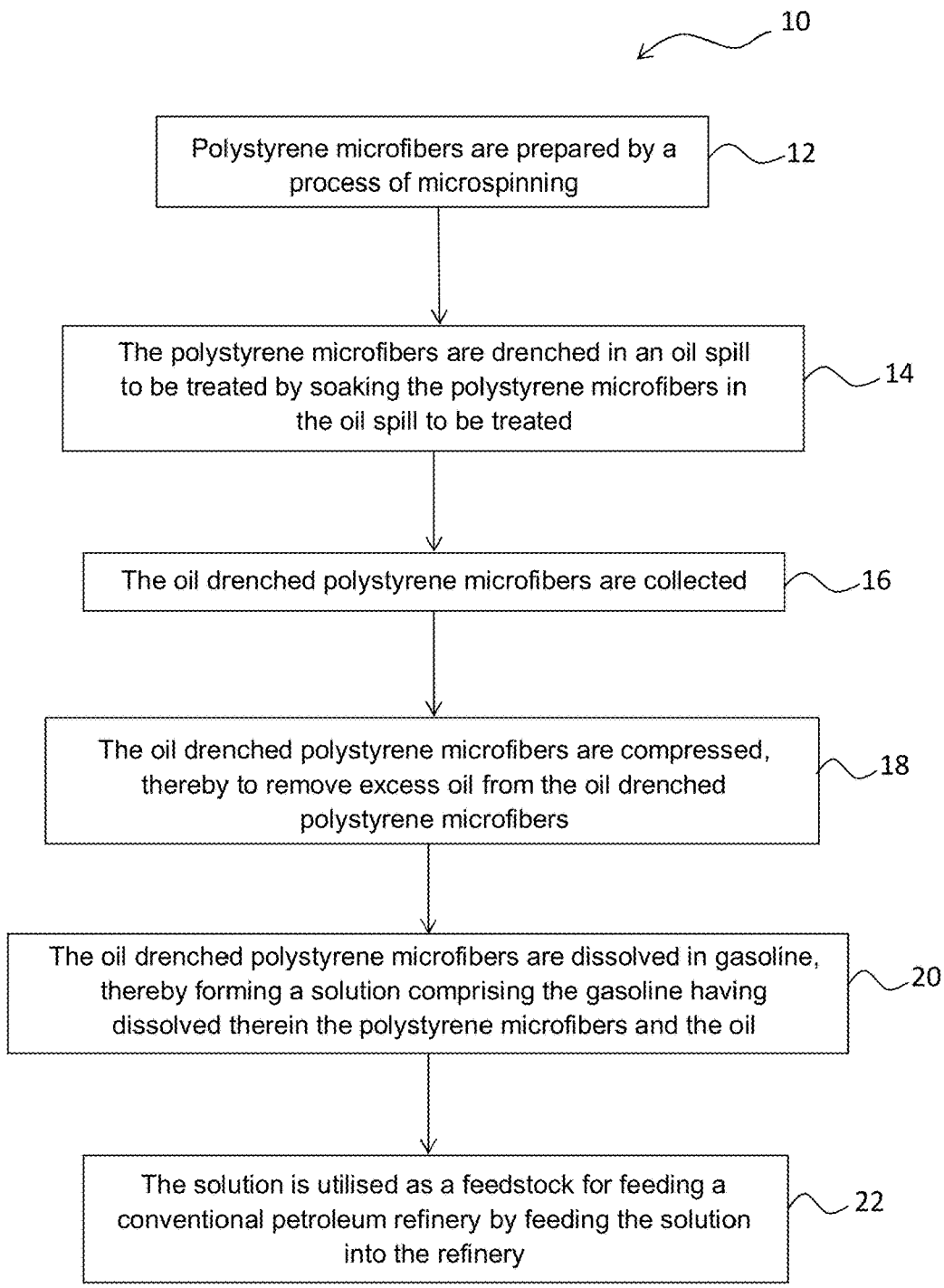
FIG. 11 shows a block diagram illustrating a method in accordance with the invention.

With reference to FIG. 11 of the drawings, a method, in accordance with the invention, for treating oil spills, is indicated generally by the reference numeral 10.

The method 10 for treating an oil spill includes broadly, providing a polystyrene-based sorbent in the form of polystyrene microfibers; drenching the polystyrene microfibers in the oil spill to be treated; collecting the oil drenched polystyrene microfibers; removing excess oil from the oil drenched polystyrene microfibers; dissolving the oil drenched polystyrene microfibers in a petroleum-based solvent in the form of gasoline having an octane number of ninety one, in which both the oil drenched polystyrene microfibers and the oil is soluble, thereby forming a solution comprising the gasoline having dissolved therein the polystyrene microfibers and the oil; and utilising the solution as a feedstock for feeding a refinery by feeding the solution into the refinery.

The method 10 for treating an oil spill may be used to clean up an oil spill in or on a body of water such as, for example, the ocean, or, alternatively, may be used to clean up an oil spill on land. Various steps in the method 10 will be described below with reference to FIG. 11 of the drawings.

In a first step 12, the polystyrene microfibers are prepared by a process of elecrospinning, as will be explained in more detail hereinbelow under the heading "Example". The polystyrene microfibers have an average diameter of approximately between 1 µm and 12 µm. The polystyrene microfibers ideally have a sorption capacity of crude oil spills of approximately 217 grams of crude oil for every gram of polystyrene microfibers.

In a second step 14, the polystyrene microfibers are drenched in the oil spill to be treated by soaking the polystyrene microfibers in the oil spill to be treated. The applicant has found that the oil is quickly absorbed by the polystyrene microfibers due to the high hydrophobic nature of the fibers.

In a third step 16, the oil drenched polystyrene microfibers are collected by any advantageous collection means, such as, for example, by skimming the oil drenched polystyrene microfibers from the surface of a body of water, by using booms, mats, or the like In a fourth step 18, excess oil from the oil drenched polystyrene microfibers is removed. More specifically, the oil drenched polystyrene microfibers are compressed, thereby to remove excess oil from the oil drenched polystyrene microfibers. In particular, the applicant has found that up to 70% of water-free crude oil that can be retrieved by compression.

In a fifth step 20, the oil drenched polystyrene microfibers are dissolved in the gasoline, thereby forming a solution comprising the gasoline having dissolved therein the polystyrene microfibers and the oil. As will be explained in more detail hereinbelow, under the heading "Example", the applicant has found that the oil drenched polystyrene microfibers are highly soluble in the gasoline and can be quickly and thoroughly dissolved therein.

In a sixth step 22, the solution is utilised as a feedstock for feeding a refinery by feeding the solution into the refinery, particularly, a conventional petroleum refinery for converting or processing crude oil into useful products. The applicant has advantageously found that the solution is particularly suitable for use as the feedstock for feeding the refinery. More specifically, due to the chemical nature of the gasoline and the polystyrene microfibers, the solution comprises hydrocarbons and as such, has a suitable chemical composition to serve as the feedstock for the refinery. Furthermore, the solution is particularly suitable to serve as the feedstock due to its overall structural similarity with crude oil. The solution comprises a clear liquid phase solution containing a homogeneous mixture of the gasoline, the dissolved polystyrene microfibers and the dissolved oil. The solution is relatively free from insoluble particulate matter.

In addition, the applicant has found that the chemical composition of the solution is almost identical to the chemical composition of conventional feedstock that flows in conventional refinery pipelines and, as such, no further treatments is required to render the solution suitable for use as the feedstock. As such, the applicant envisages that the method 10 is extremely advantageous over known methods as the method 10 does not result in further pollution, but rather the polystyrene microfibers, the gasoline and the cleaned up oil from the oil spill are all fed into the refinery and converted into a useful petroleum based product. As such, no further pollution or soiled oil soaked product is left over after the method has been used to clean up the oil spill.

Advantageously, all of the material used to clean up the oil spill, including the retrieved oil is simply processed into useful petroleum products, thereby ameliorating the generation of further pollutants. As such, the applicant envisages that the method 10 is a more environmentally advantageous method for cleaning up an oil spill.

Furthermore, the applicant has found that the use of polystyrene microfibers having a high absorption capacity is particularly important as it results in a low ratio of polystyrene microfibers to absorbed crude oil. More specifically, the applicant has advantageously found that due to the low ratio of polystyrene microfibers to absorbed crude oil, a relatively minuscule amount of polystyrene microfibers is present in the solution. Furthermore, the applicant has found that due to the relatively minuscule amount of polystyrene microfibers present in the solution, the polystyrene microfibers will easily dissolve in the gasoline, thus causing no contamination to the feedstock.

EXAMPLE

Two types of polystyrene polymer beads (Mw=100,000 and 350,000 g/mol) were obtained from Avocado Research Chemicals Ltd and Sigma-Aldrich Companies, respectively. These two types of polystyrene were used to produce polystyrene microfibers, as will be described in more detail hereinbelow. The polystyrene microfibers produced as explained below will hereinafter be referred to as PSI and PSII, respectively.

N,Ndimethylformamide (DMF) (>99.8%) used in the production of the polystyrene mircofibres was obtained from Fluka, Switzerland. Crude oil used to test the absorption of the polystyrene microfibers was obtained ADNOC, Abu Dhabi, UAE.

Fabrication of the polystyrene microfibers will now be described hereinbelow.

Homogeneous solutions of PSI and PSII containing 20, 30, and 40 w/v % were prepared by dissolving the corresponding amounts of the polystyrene polymer beads in DMF. The polystyrene microfibers were then made using an electrospinning technique where 5 cc of each of the polymer solutions were injected at a feeding rate of 10 ml/hr using an automatic syring pump, under the effect of a voltage of 20 kV, provided by a Gama High Voltage Research power supply, towards a grounded metallic collector located at a 15 cm from the syringe. The electrospinning process was carried out in a non-humid atmosphere at room temperature. The electrospun polystyrene microfibers were collected on an aluminum foil sheet, and were left till complete dryness before studying their morphology and sorption capacities.

The polystyrene microfibers were characterized for their morphology, BET surface area and pore size distribution. Analysis of the fibers morphology was carried out using a scanning electron microscope (Cambridge Instrument SEM 360) after being gold-coated. Fibers size and distribution were calculated using image analysis software (ImageJ, National Institutes of Health, Bethesda, Md.). BET surface area, porosity, and pore size distribution were carried out using a nitrogen gas adsorption at 77 K employing a Quantochrome NOVA 1000 volumetric gas sorption instrument; Autosorb, USA.

To test the sorption capacity of the polystyrene microfibers, a 10 ml of crude oil was poured into a 200-mL beaker containing 100 mL artificial seawater (35% NaCl). Different amounts of the polystyrene microfibers (0.005, 0.01, 0.05, and 0.1 g) were then evenly placed onto the oil surface. After various time intervals, namely, 0.5, 1, 2, 5, 10 and 30 minutes, the material was removed using a needle, drained for one minute, and placed on a watch glass for weighing. All experiments were performed at ambient temperature and all weighing performed using analytical balance with readability up to 0.01 mg (5 decimal places). The oil sorption capacity (g/g) of the sorbent was determined by following equation:

$$Q = \frac{M_0 - m_s}{m_s}$$

Where Q is the oil sorption capacity (g/g), $m_0$ is the total mass of sorbent after the oil drained, and $m_s$ is the mass of the dry sorbent. Results are expressed as an average of triplicate readings.

Figures 1A, 1B, 1C:
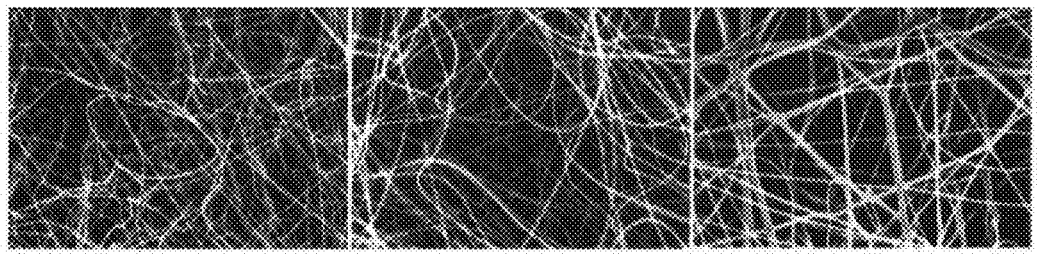
FIG. 1A shows a scanning electron microscope (SEM) image of a polystyrene-based sorbent in the form of polystyrene microfibers (PSI) electrospun from a solution containing 20% w/v % of polystyrene and used in a method in accordance with the invention.
FIG. 1B shows a SEM image of a polystyrene-based sorbent in the form of polystyrene microfibers (PSI) electrospun from a solution containing 30 w/v % of polystyrene and used in a method in accordance with the invention.
FIG. 1C shows a SEM image of a polystyrene-based sorbent in the form of polystyrene microfibers (PSI) electrospun from a solution containing 40 w/v % of polystyrene and used in a method in accordance with the invention.
Figures 1D, 1E, 1F:
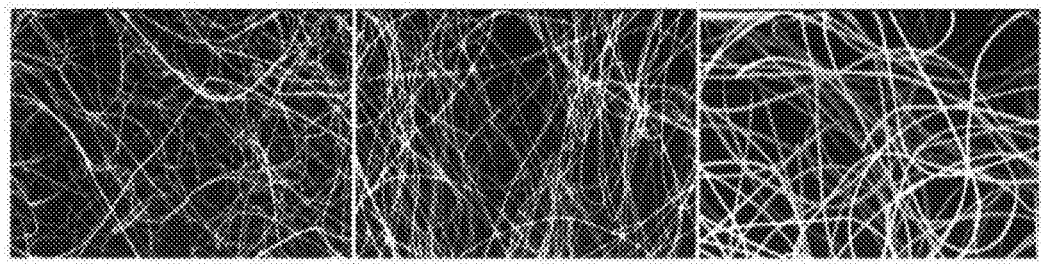
FIG. 1D shows a SEM image of a polystyrene-based sorbent in the form of polystyrene microfibers (PSII) electrospun from a solution containing 20 w/v % of polystyrene and used in a method in accordance with the invention.
FIG. 1E shows a SEM image of a polystyrene-based sorbent in the form of polystyrene microfibers (PSII) electrospun from a solution containing 30 w/v % of polystyrene and used in a method in accordance with the invention.
FIG. 1F shows a SEM image of a polystyrene-based sorbent in the form of polystyrene microfibers (PSII) electrospun from a solution containing 40 w/v % of polystyrene and used in a method in accordance with the invention.
Figure 2A:
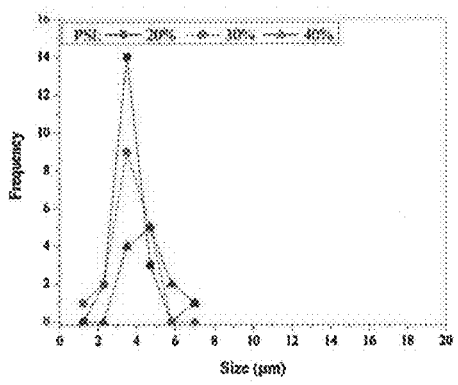
FIG. 2A shows a graph showing the fiber size distribution of the polystyrene-based sorbents of FIGS. 1A to 1C.
Figure 2B:
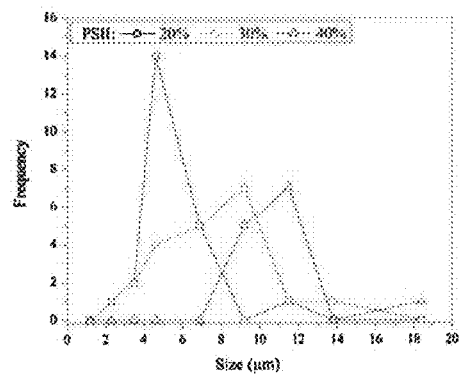
FIG. 2B shows a graph showing the fiber size distribution of the polystyrene-based sorbents of FIGS. 1D to 1F.
Figure 2C:
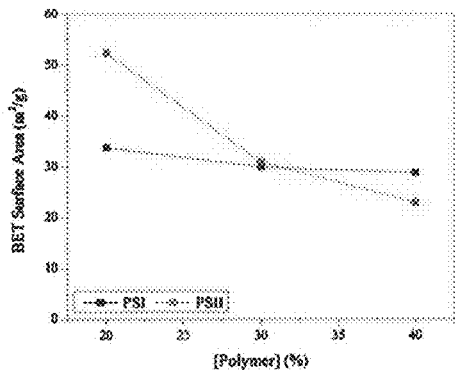
FIG. 2C shows a graph showing BET surface area of the polystyrene-based sorbents of FIGS. 1A to 1F as a function of polymer initial concentration.
Figures 3A, 3B:
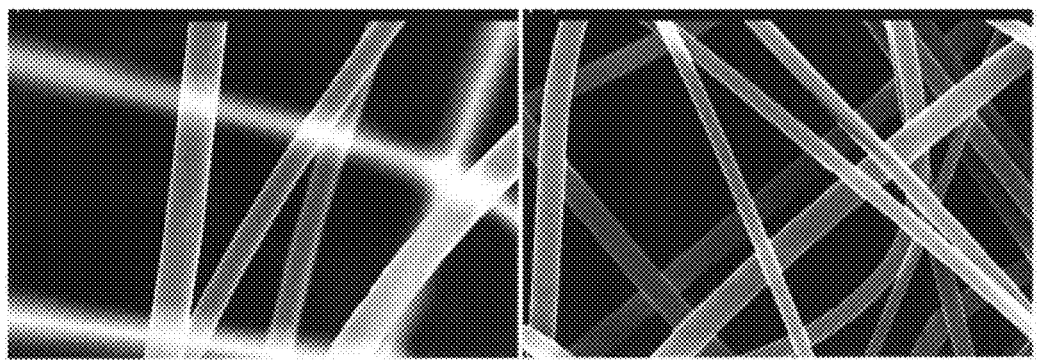
FIG. 3A shows an image of the polystyrene-based sorbent of FIG. 1B, the image was obtained from a scanning electron microscope (SEM) at higher magnification.
FIG. 3B shows an image of the polystyrene-based sorbent of FIG. 1E, the image was obtained from a scanning electron microscope (SEM) at higher magnification.

For most of the polystyrene microfibers produced by electrospinning, homogeneity of the fiber size and distribution is a pre-requisite. FIGS. 1A to 1F show SEM micrographs of polystyrene microfibers produced by electrospinning, as described hereinabove, as a function of the initial concentration of the polymer solutions in DMF. Using the pre-optimized electrospinning parameters, bead-free and nonwoven polystyrene microfibers were produced. Variation of the polymer initial concentration slightly affected the fiber morphology or the monodispersity of the fibers. As seen in FIGS. 2A and 2B, the effect of changing the polymer initial concentration on the average size and distribution of the electrospun fibers is shown. Monodisperse fibers with an average of 3.5 pm were produced from solutions containing various concentrations of PSI polymer. On the other hand, an increase in the average size of the fibers from 4.5 to 1 1.5 pm was shown by increasing the initial concentration of the PSII solutions from 20 to 40%. This could be attributed to the difference in molecular weight of the polymers, which is known to highly affect the viscosity of solutions prepared thereof. This, in turn, is also known to be yield coarser fibers. The variation of surface area of the fibers with the polymer concentration is illustrated in FIG. 2C. A more pronounced decrease in the surface area of the fibers produced from PSII solutions was shown as compared to that of fibers produced from the lower molecular weight PSI solutions. This is considered a reasonable consequence of the variations of the fiber size of the polymers. Detailed SEM investigation of the fibers morphology was carried out by at higher magnification as shown in FIGS. 3A and 3B. All fibers were cylindrical in shape with a smooth non-porous surface topography. This could be attributed to the fact that all fibers were prepared in a non-humid environment from a single solvent (DMF) system.

Figure 4A:
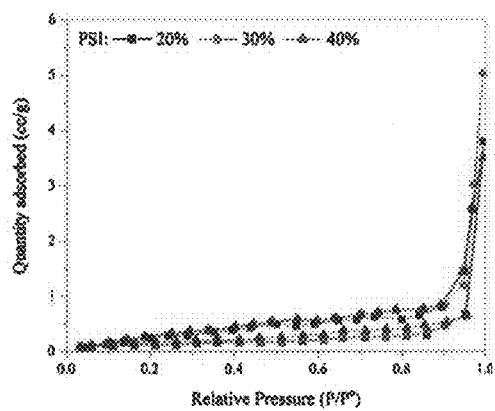
FIG. 4A shows a graph showing adsorption isotherms of the polystyrene-based sorbents of FIGS. 1A to 1C.
Figure 4B:
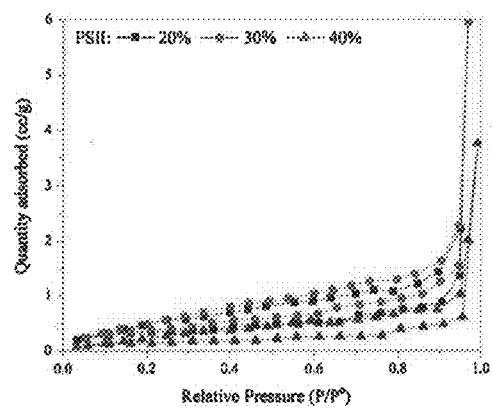
FIG. 4B shows a graph showing adsorption isotherms of the polystyrene-based sorbents of FIGS. 1D to 1F.
Figure 5A:
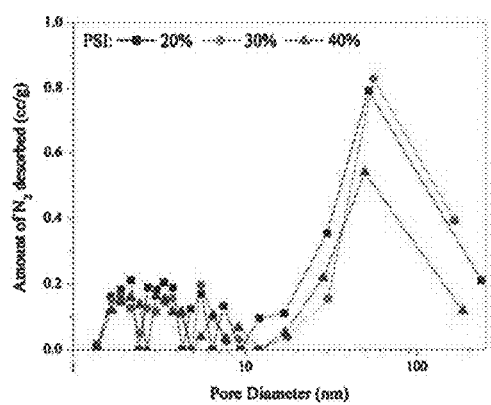
FIG. 5A shows a graph showing pore size distribution of the polystyrene-based sorbents of FIGS. 1A to 1C.
Figure 5B:
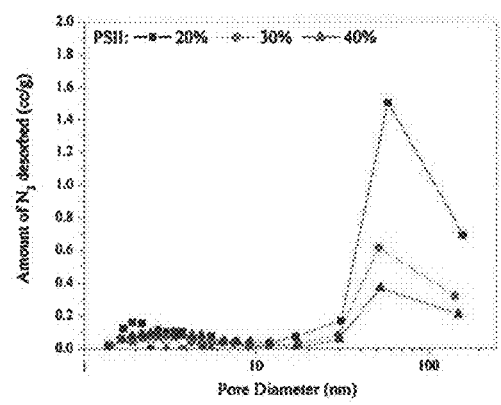
FIG. 5B shows a graph showing pore size distribution of the polystyrene-based sorbents of FIGS. 1D to 1F.

As a result, adsorption-desorption isotherms shown in FIGS. 4A and 4B reflect this morphology where all fibers showed type IV isotherms with a low extent of $N_2$ adsorption. Unlike the slight variation in the maximum adsorbed volume of $N_2$ onto the fibers prepared from PSI solutions, a more pronounced variation was shown in the isotherms corresponding to fibers electropsun from PSII solutions. This in turn was also reflected in a variation in the pore size distribution curves of these samples (see FIGS. 5A and 5B). All fiber mats showed homogeneous pore size distribution with a unique presence of macroporosity. The absence of signs of meso or microporosity in these distribution curves confirms the smooth non-porous morphology of the fibers shown in FIGS. 3A and 3B. Based on these findings, it is evident that non-woven highly porous microfibrous meshes were obtained, which were therefore subjected to evaluation of their sorption efficiency of highly viscous crude oil spills.

Figure 6A:
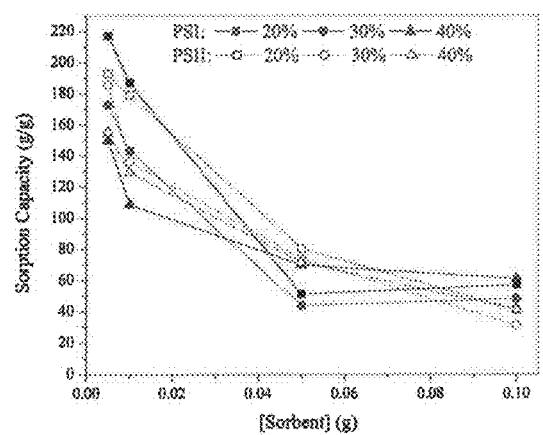
FIG. 6A shows a graph showing sorption capacity of crude oil by the polystyrene-based sorbents of FIGS. 1A to 1F.
Figure 6B:
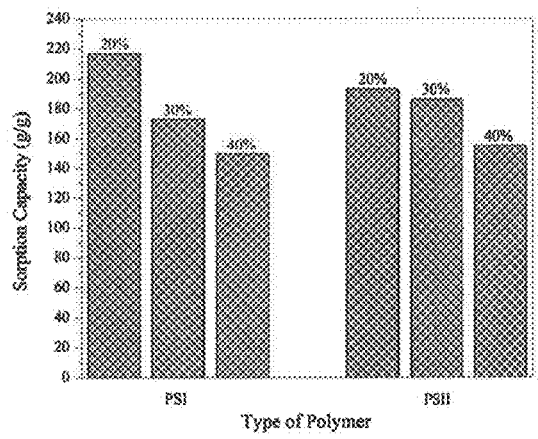
FIG. 6B shows a graph showing the highest achieved sorption capacities after 30 seconds of immersion of the polystyrene-based sorbents of FIGS. 1A to 1F, in crude oil-water medium as a function type and initial concentrations of each of the polystyrene-based sorbents of FIGS. 1A to 1F.
Figure 7A:
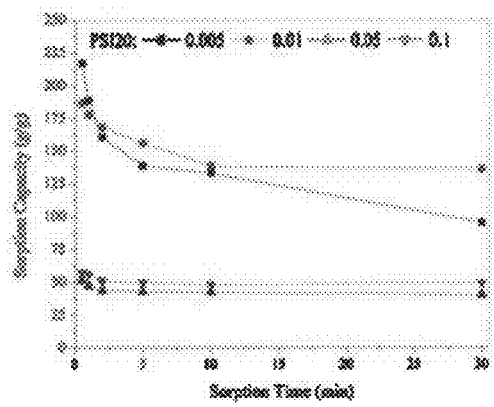
FIG. 7A shows a graph showing variation of the sorption capacity of crude oil with time for the polystyrene-based sorbent of FIG. 1A.
Figure 7B:
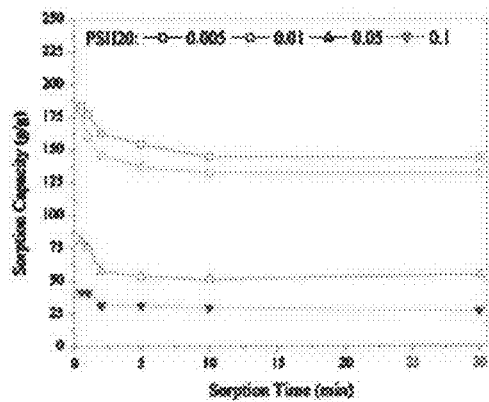
FIG. 7B shows a graph showing variation of the sorption capacity of crude oil with time for the polystyrene-based sorbent of FIG. 1D.
Figure 7C:
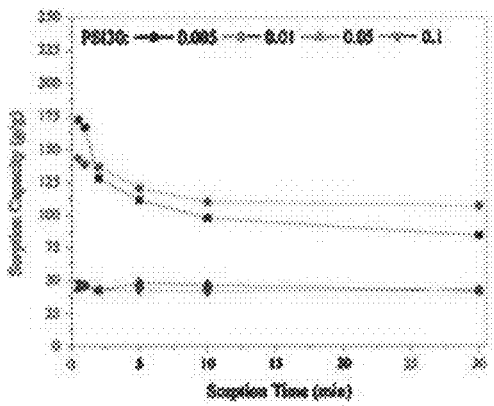
FIG. 7C shows a graph showing variation of the sorption capacity of crude oil with time for the polystyrene-based sorbent of FIG. 1B.
Figure 7D:
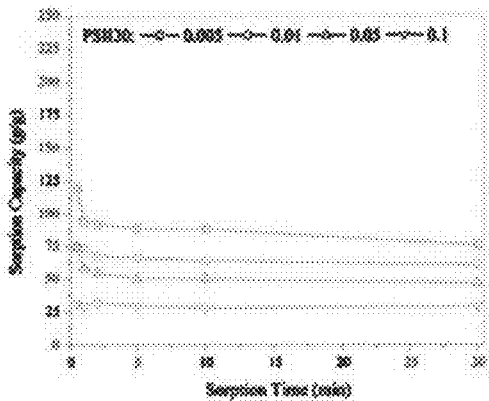
FIG. 7D shows a graph showing variation of the sorption capacity of crude oil with time for the polystyrene-based sorbent of FIG. 1E.
Figure 7E:
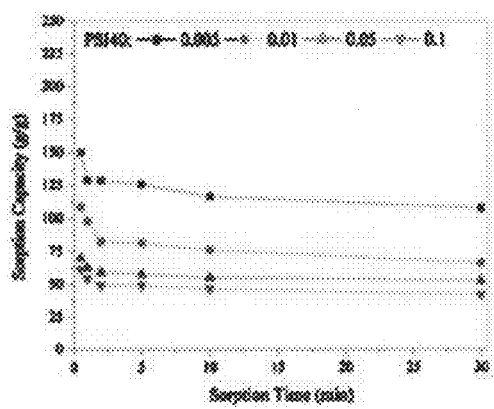
FIG. 7E shows a graph showing variation of the sorption capacity of crude oil with time for the polystyrene-based sorbent of FIG. 1C.
Figure 7F:
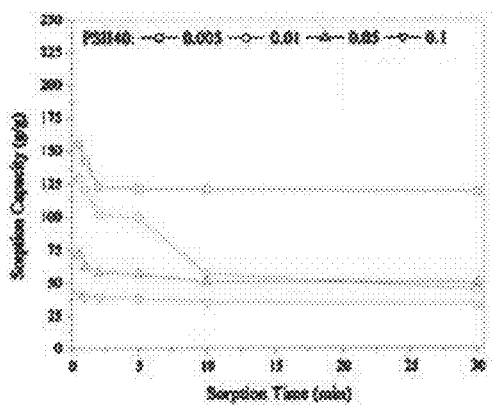
FIG. 7F shows a graph showing variation of the sorption capacity of crude oil with time for the polystyrene-based sorbent of FIG. 1F.

FIG. 6B shows the highest achieved sorption capacity after 30 seconds of immersion of the polystyrene microfibers in crude oil/water mixtures as a function of the type of polymer, initial concentration of polymer and weight of polystyrene microfibers. All polystyrene microfibers showed a decrease in the sorption efficiency by increasing the starting weight of sorbent at a constant loading of oil in the oil/water mixtures, which indicate that smallest amounts of polystyrene microfibers are needed for these experiments. These results also indicate the high efficiency of the polystyrene microfibers used in the current study in separating oil spills from water. Polystyrene microfibers made from 20% polymer solutions showed the highest initial sorption capacities at all sorbent weights. This could be related to the relatively smaller size of polystyrene microfibers made from these solutions as compared with polystyrene microfibers made from 30% and 40% solutions. This performance is attributed to the increase in affinity of the polystyrene microfibers towards the attraction (adsorption) of more oil as a result of the increase in their surface area with the decrease in their size. The highest initial sorption capacity achieved was 217 and 192 g/g using fibers made from 20% solutions of PSI and PSII, respectively at a constant sorbent weight of 0.005 g. The high density and viscosity of the studied crude oil samples contribute to the sorption capacity values, which are the highest compared with various synthetic polymer based sorbents as shown in Table 1.

Figure 8A:
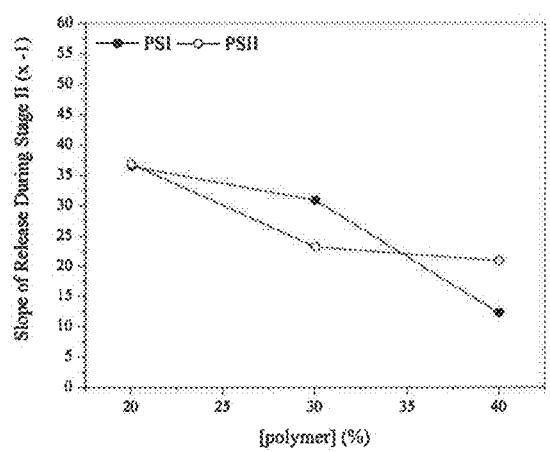
FIG. 8A shows a graph showing a rate of release of first sorbed crude oil from the polystyrene-based sorbents of FIGS. 1A to 1F, during the first five minutes of sorption, as calculated by the slope of their release lines in FIG. 6B.
Figure 8B:
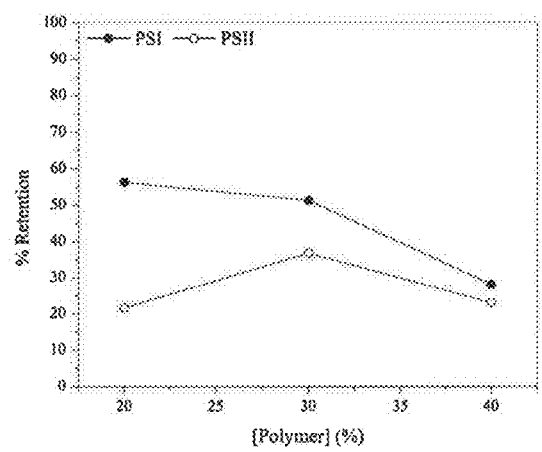
FIG. 8B shows a graph showing maximum percentage retention of the crude oil into the polystyrene-based sorbents of FIGS. 1A to 1F, as a function of the initial concentration of each of the polymer solutions.
Figure 9:
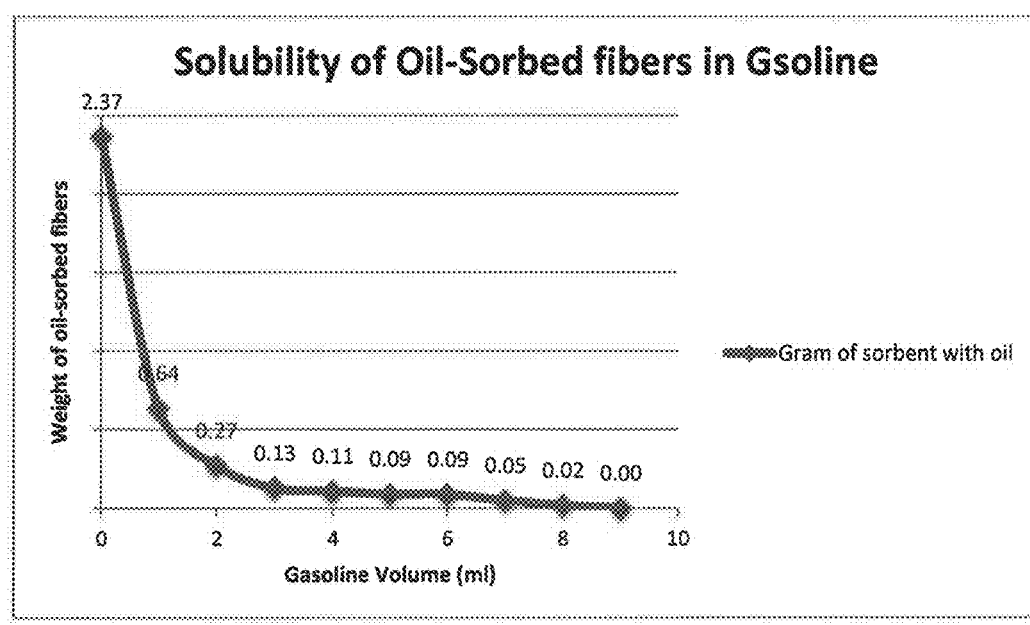
FIG. 9 shows a graph showing solubility of oil drenched polystyrene-based sorbents of FIGS. 1A to 1F, as a function of weight of the polystyrene-based sorbents of FIGS. 1A to 1F.

FIGS. 7A to 7F show the variation of the sorption capacity with the initial concentration of both polymers at a constant sorbent weight of 0.005 g after 30 seconds of immersion. It is strongly evident that smaller size polystyrene microfibers produced from polymer solutions of lower initial concentrations showed higher initial sorption capacity. These results; therefore, show the correlation between polystyrene microfibers characteristics and their efficiency in adsorbing oil from oil/water samples. Detailed sorption performance as a function of time of all samples is shown in FIGS. 8A and 8B. Three main stages take place in each sorption experiment. Throughout each experiment, an initial sorption stage takes place within the first minute as a result of the direct interaction between the hydrophobic crude oil and the hydrophobic fibers. During this stage, oil penetrates within the interconnected porosities of the microfibrous sorbent covering all fibers with multilayers of oil. As a result, an overall maximum sorption (retention) capacity is achieved. This stage is followed by two stages where extra oil was released from the polystyrene microfiber sorbent. The first stage of release is relatively fast and lasts for 2-3 minutes, followed by a slower release stage for the following 25 minutes where a plateau is reached. Based on the performance of all studied polystyrene microfiber sorbents, additional time was not required where no significant effect would take place on the sorption or retention of the sorbed oil.

FIG. 8A shows the rate of release of the oil from polystyrene microfibers as a function of the polymers initial concentrations. These rates were calculated by measuring the slopes of their respective sorption curves. An overall faster rate of release was observed with increasing the initial concentration of the lower molecular weight (100,000 g/mol) polymer as compared with that of the higher molecular weight (350,000 g/mol) polymer.

This is in accordance with the results in FIGS. 7A to 7F where high initial sorption capacity was accompanied with higher release of the un-adsorbed oil. On the other hand, the plateau reached within the third stage of sorption indicates the complete release of all un-adsorbed oil layers. FIG. 8B shows the percent retention of the adsorbed oil as a function of the initial concentration of the polymer solutions. This was calculated using the following equation:

$$\% \text{ Retention} = \frac{S_i - S_t}{S_i}$$

Where $S_i$ is the initial sorption capacity after 30 seconds of immersion, St is the sorption capacity at the plateau. It can be shown that more than 50% of the adsorbed oil retained within and onto the porous microfibrous sorbent. Despite the fact that PSII sorbent showed relatively higher porosity (FIG. 5B), it showed lower initial oil pickup and lower retention capacity where more open channels are available for oil dripping to take place. After complete release of the un-adsorbed oil, the retained oil showed sorption capacities of 30-147 g/g, which are still considered the highest compared with what has been cited so far in experiments using polystyrene and crude oil.

The applicant has found that within the first few minutes of sorption where a maximum retention of oil was achieved, oil-containing sorbents could be allowed to drip in empty containers to maintain a high efficiency of crude oil removal and recovery.

The effects of varying the polymers initial concentrations and weights of the polymer fibrous sorbents on the sorption capacities were evaluated for 30 minutes. Results showed a high initial pick up of the crude oil by the sorbent microfibers within the first few minutes, achieving a sorption capacity of as high as 217 g/g using 5 mg of the fibrous sorbent. Dripping of the oil took place on a second stage decreasing the amount of crude oil sorbed to 50% of what was initially sorbed. A plateau was reached in the sorption curves of all studied sorbents after 5 minutes where 25-50% of the sorbed oil remained within the polystyrene microfiber sorbent. The high sorbent characteristics of the polystyrene microfibers are attributed to the high surface area of the polystyrene microfibers and the interconnected porosity within the randomly distributed fibers of the polystyrene microfiber sorbent.

The applicant has particularly found that the polystyrene microfibers can be produced at a low costs as these were originally obtained from recycled polystyrene foam. Due to the use of the polystyrene microfibers in the method 10, the polystyrene microfibers have a great economic and commercial value. The applicant has also found that the method in accordance with the invention simultaneously solves two environmental problems, namely cleaning up of an oil spills and recycling of polystyrene waste.

The applicant has particularly, found that polystyrene microfibers with a high surface area and a high degree of interconnectivity of the porosities within the microfibers, particularly results in increased sorption capacity. More particularly, the applicant has found that sorption capacities of 217 g of crude oil per gram of polystyrene microfibers prepared from 20% PS solution ($M_w$ 100,000). The applicant has further found that polystyrene microfibers with higher sorption capacities are particularly beneficial to be used in the method 10.

While the present invention has been described with respect to specific examples, it should be appreciated that the present invention is not limited to these examples. It is to be believed that one skilled in art, using the preceding description, can utilize the present invention to its fullest extent, and many variations and modifications may present themselves to those of skill in the art without diverting from the scope of the present invention.

What is claimed is:

1. A method for treating oil, the method comprising:
providing a polystyrene-based microfiber sorbent;
drenching the polystyrene-based microfiber sorbent in the oil to be treated;
dissolving the oil drenched polystyrene-based microfiber sorbent in a petroleum-based solvent in which both the oil drenched polystyrene-based microfiber sorbent and the oil is soluble to form a homogenous solution comprising the petroleum-based solvent having dissolved therein the polystyrene-based microfiber sorbent and the oil;
utilizing the solution as a feedstock for feeding a conventional petroleum refinery; and
converting the solution into conventional petroleum products.

2. The method as claimed in claim 1, wherein the polystyrene-based microfiber sorbent has a sufficiently high sorption capacity so as to result in a sufficiently low ratio in the solution of polystyrene-based microfiber sorbent to oil, to render the solution suitable as the feedstock for feeding the refinery.

3. The method as claimed in claim 1, wherein the polystyrene-based microfiber sorbent has a sorption capacity in the range of between 30 g/g to 217 g/g, measured as grams of oil sorbed per one gram of the polystyrene-based microfiber sorbent.

4. The method as claimed in claim 1, wherein after drenching the polystyrene-based microfiber sorbent in the oil to be treated, the method further includes collecting the oil drenched polystyrene-based microfiber sorbent.

5. The method as claimed in claim 1, wherein the polystyrene-based microfiber sorbent are electrospun microfibers.

6. The method as claimed in claim 5, wherein the polystyrene based microfiber sorbent are formed from recycled material.

7. The method as claimed in claim 1, wherein the petroleum-based solvent is selected from the group comprising gasoline, kerosene and gas oil.

8. The method as claimed in claim 7, wherein the petroleum-based solvent is gasoline.

9. The method as claimed in claim 8, wherein the gasoline has an octane number in the range of between 78 and 95.

10. The method as claimed in claim 9, wherein the gasoline has an octane number of ninety one.

11. The method as claimed in claim 1, wherein the solution comprises hydrocarbons and as such, the solution has a suitable chemical composition to serve as the feedstock for the refinery.

12. The method for treating oil as claimed in claim 1, wherein the step of providing the polystyrene-based microfiber sorbent comprises electrospinning polystyrene to produce said polystyrene-based microfiber sorbent.

* * * * *